(12) United States Patent
Dettinger et al.

(10) Patent No.: US 7,991,782 B2
(45) Date of Patent: Aug. 2, 2011

(54) ITERATIVE DATA ANALYSIS ENABLED THROUGH QUERY RESULT ABSTRACTION

(75) Inventors: Richard D. Dettinger, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 11/944,396

(22) Filed: Nov. 21, 2007

(65) Prior Publication Data
US 2008/0071734 A1    Mar. 20, 2008

Related U.S. Application Data

(62) Division of application No. 10/431,916, filed on May 8, 2003, now Pat. No. 7,340,480.

(51) Int. Cl.
G06F 7/00    (2006.01)

(52) U.S. Cl. .................................. 707/757; 707/803

(58) Field of Classification Search .................. 707/754, 707/756, 757, 803
See application file for complete search history.

(56) References Cited

U.S. PATENT DOCUMENTS

| | | | |
|---|---|---|---|
| 5,584,026 A | 12/1996 | Knudsen et al. | |
| 5,734,887 A | 3/1998 | Kingberg et al. | |
| 5,956,707 A | 9/1999 | Chu | |
| 6,272,488 B1 | 8/2001 | Chang et al. | |
| 6,411,950 B1 | 6/2002 | Moricz et al. | |
| 6,725,227 B1 | 4/2004 | Li | |
| 6,954,748 B2 | 10/2005 | Dettinger et al. | |
| 7,340,480 B2 | 3/2008 | Dettinger et al. | |
| 7,437,690 B2 | 10/2008 | Baumgartner et al. | |
| 7,574,432 B1 * | 8/2009 | De Bellis | 707/4 |
| 7,689,551 B2 | 3/2010 | Dettinger et al. | |
| 2004/0186827 A1 | 9/2004 | Anick et al. | |
| 2005/0182917 A1 | 8/2005 | Gilkerson | |
| 2008/0071758 A1 | 3/2008 | Dettinger et al. | |
| 2008/0154864 A1 | 6/2008 | Dettinger et al. | |

OTHER PUBLICATIONS

W. Chu et al., A Structure Approach for Cooperative Query Answering, IEEE Transactions on Knowledge and Data Engineering, vol. 6, No. 5, pp. 738-749, Oct. 1994.
H. P. Kumar et al., Browing hierarchical data with multi-level dynamic queries and pruning, Int. J. Human-Computer Studies (1997), vol. 46, pp. 103-124.
R. Ramakrishnan, Database Management Systems, WCB/McGraw-Hill, 1998, pp. 22-23.
C. Ahlberg et al., Dynamic Queries for Information Exploration: An Implementation and Evaluation, ACM CHI '92, May 3-7, 1992, pp. 619-626.
S. Jones, Graphical Query Specification and Dynamic Result Previews for a Digital Library, ACM UIST '98, San Francisco, CA, 1998, pp. 143-151.
Office Action History of patented U.S. Appl. No. 10/431,916, dates ranging from Feb. 1, 2006 to Sep. 7, 2007.
Office Action History of patented U.S. Appl. No. 11/944,394, dates ranging from Feb. 18, 2009 to Nov. 17, 2009.
Office Action History of abandoned U.S. Appl. No. 12/041,548, dated Jun. 10, 2009.
Office Action History of pending U.S. Appl. No. 11/944,399, dates ranging from Jan. 22, 2010 to Jul. 14, 2010.

\* cited by examiner

*Primary Examiner* — Cheyne D Ly
(74) *Attorney, Agent, or Firm* — Patterson & Sheridan, LLP; Grant A. Johnson

(57) ABSTRACT

The present invention is generally directed to a system, method and article of manufacture for accessing data represented abstractly through an abstraction model. In one embodiment, a data repository abstraction layer provides a logical view of an underlying data repository that is independent of the particular manner of data representation. For each successive query, the data repository abstraction layer is replaced or redefined to provide a restricted logical view of the underlying data repository.

10 Claims, 12 Drawing Sheets

ITERATIVE DATA ANALYSIS ENABLED THROUGH QUERY RESULT ABSTRACTION

CROSS-RELATED APPLICATIONS

This is a divisional of U.S. patent application Ser. No. 10/431,916 filed May 8, 2003, now U.S. Pat. No. 7,340,480 which is herein incorporated by reference.

BACKGROUND OF THE INVENTION

1. Field of the Invention

The present invention generally relates to data processing, and more particularly, to the accessing data through a logical framework.

2. Description of the Related Art

Databases are computerized information storage and retrieval systems. The most prevalent type of database is the relational database, a tabular database in which data is defined so that it can be reorganized and accessed in a number of different ways. A relational database management system (DBMS) is a database management system that uses relational techniques for storing and retrieving data.

Regardless of the particular architecture, in a DBMS, a requesting entity (e.g., an application, the operating system or a user) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

In many cases, particularly in research-oriented environments, the task of analyzing information is typically a multi-step process involving generation of an initial set of query results that is further reduced through subsequent queries. For example, in a medical research environment, an initial query could be posed to find a set of research candidates meeting a particular diagnosis or test result profile. In a large data warehouse environment, it may take a lot of time and resources to process a query of this nature, in particular if the criteria specified is complex. Once the query results are returned, it may be desirable to apply other criteria to further reduce or subset the results returned. While this could be accomplished by extending the original query with additional logic, it would be more efficient to perform the subsequent query against the results of the original query. Unfortunately, current methods to address this scenario are typically rather manual and error prone. Specifically, the user is required to go through several steps to save the results from the original query in a form that would allow for subsequent queries to be performed against it. In a relational environment, this would require a table to be created to hold the results of the original query. Similarly, in an XML-based repository, query result data would need to be stored in the repository in order to be re-queried. In either case, the user would then need to understand the physical schema used to represent the initial query results and expresses subsequent query taking this schema into account.

Another problem encountered in the iterative query scenario is that a subsequent query may not return a desired set of results. The user may then wish to go back to a prior point in the progression of intermediate query results. Using conventional techniques the user must consciously save the results from each query in order to re-establish a prior query iteration.

Therefore, what is needed is a query framework providing flexibility in data analysis.

SUMMARY OF THE INVENTION

The present invention provides a method, system and article of manufacture for accessing physical data through an abstraction model. The abstraction model includes metadata describing and defining a plurality of logical fields.

In one aspect, a method of using a logical framework to query data is provided. The method includes at least defining a logical view of the data; and iteratively restricting the logical view of the data for each successive abstract query, based on at least one result criterion of an immediately previous abstract query.

In another aspect, a method for constructing abstract queries defined by logical fields is provided. The method includes at least providing an initial abstract data model defining a plurality of logical fields mapped to physical data having a particular schema; receiving a first abstract query comprising at least one condition and a result criterion comprising at least one of the plurality of logical fields; transforming the first abstract query into an executable query with reference to the initial abstract data model; executing the executable query; returning results produced by execution of the executable query; and generating another abstract data model comprising only the at least one of the plurality of logical fields of the result criterion, wherein the at least one of the plurality of logical fields is mapped to the results.

In another aspect, a method for constructing abstract queries defined by logical fields is provided. The method includes at least providing an initial abstract data model defining a plurality of logical fields and mapping each logical field to physical data; receiving a first abstract query comprising at least two logical fields defined by the initial abstract data model; transforming the first abstract query into an executable query with reference to the initial abstract data model; executing the executable query; returning results produced by execution of the executable query; and generating another abstract data model. Generating another abstract data model includes, for each of the at least two logical fields of the first abstract query, (i) retrieving, from the initial abstract data model, a logical field definition for the logical field; (ii) updating the logical field definition to refer to a portion of the results; and (iii) adding the updated logical field definition to the another abstract data model.

Yet another aspect provides a computer-readable medium containing a program which, when executed by a processor, performs an operation for each abstract query in a succession of abstract queries. The operation includes at least initializing an abstract data model; adding to the abstract data model only those one or more logical fields defined as result fields in the abstract query; mapping each logical field of the abstract data model to a different portion of results returned for the abstract query as a result of being executed; making the abstract data model available for construction of a next abstract query in the succession of abstract queries, whereby logical fields defined by a given abstract data model are limited to those defined as result fields in a last-executed abstract query of the succession of abstract queries.

Still another aspect provides a computer comprising a memory and at least one processor, and further comprising a framework for defining and processing abstract queries for accessing physical data. The framework includes at least an abstract data model generator configured to generate abstract data models based on (i) a logical result field of a last-executed abstract query in a series of abstract queries; and (ii) results returned for the last-executed abstract query. Each abstract data model defines a logical view of the data and includes at least (a) a logical field definition only for each logical result field of the last-executed abstract query; and (b) mapping information for each of the one or more logical field definitions, which maps each of the logical field definitions to a separate portion of the results returned for the last-executed abstract query.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

One embodiment of the invention is implemented as a program product for use with a computer system and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

In one embodiment, a particular data definition framework (also referred to herein as a data repository abstraction (DRA) layer/component/model or abstract data model) is provided for accessing (e.g., querying and modifying) data independent of the particular manner in which the data is physically represented. The DRA includes metadata describing and defining a plurality of logical fields which map to physical data. For each iterative query, a DRA is derived based on the results of the query. The subsequent query is then executed based on the most current derived DRA.

Physical View of Environment

Figure 1:
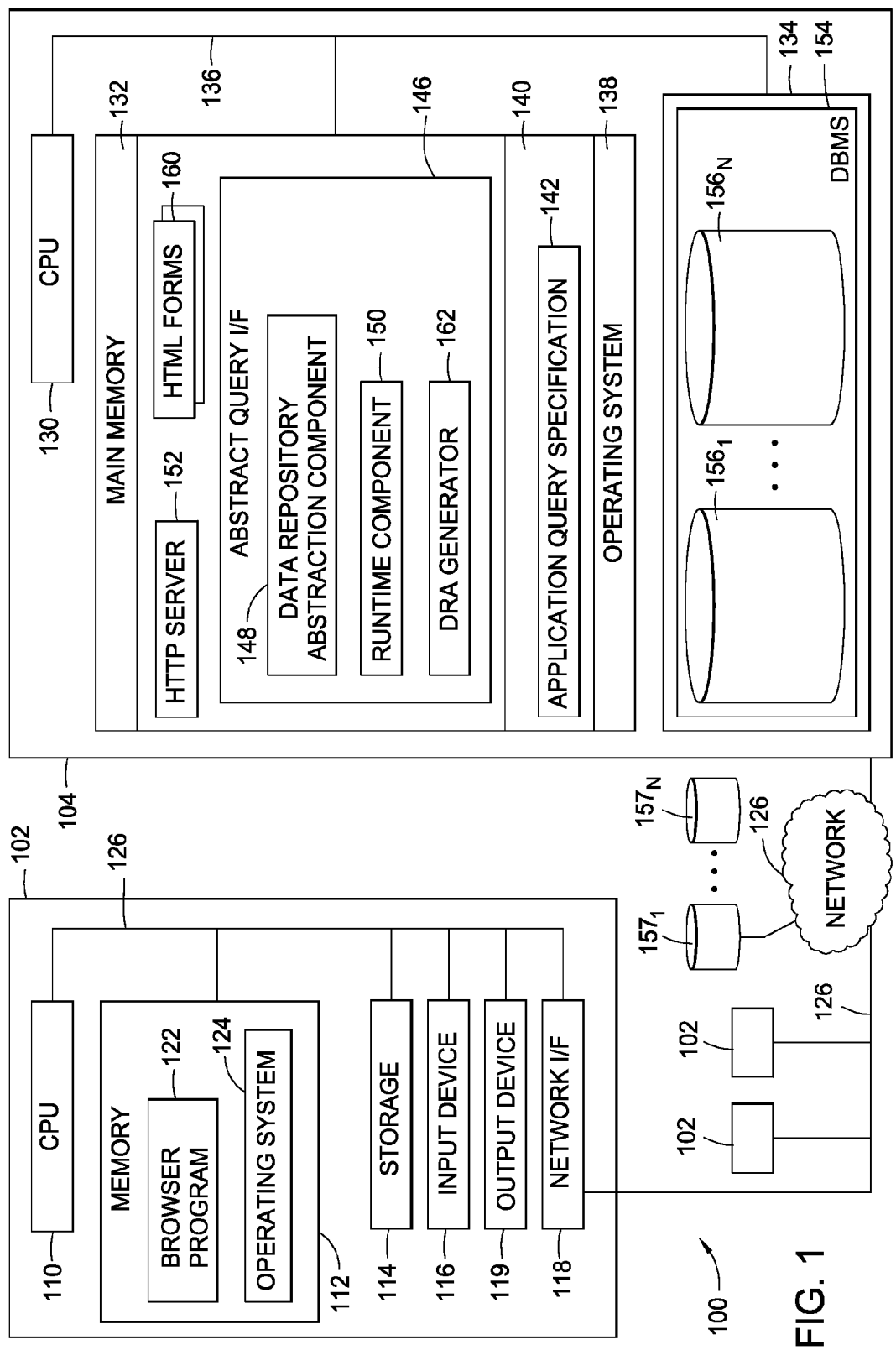
FIG. 1 is a block diagram of an illustrative computer architecture.

FIG. 1 depicts a block diagram of a networked system 100 in which embodiments of the present invention may be implemented. In general, the networked system 100 includes a client (i.e., generally any requesting entity such as a user or application) computer 102 (three such client computers 102 are shown) and at least one server computer 104 (one such server computer 104 is shown). The client computer 102 and the server computer 104 are connected via a network 126. In general, the network 126 may be a local area network (LAN) and/or a wide area network (WAN). In a particular embodiment, the network 126 is the Internet. However, it is noted that aspects of the invention need not be implemented in a distributed environment. As such, the client computers 102 and the server computer 104 are more generally representative of any requesting entity (such as a user or application) issuing queries and a receiving entity configured to handle the queries, respectively.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products comprising a plurality of instructions that are resident at various times in various memory and storage devices in the computer system 100. When read and executed by one or more processors 130 in the server 104, the applications 140 and the abstract query interface 146 cause the computer system 100 to perform the steps necessary to execute steps or elements embodying the various aspects of the invention. The applications 140 (and more generally, any requesting entity, including the operating system 138 and, at the highest level, users) issue queries against a database. Illustrative sources against which queries may be issued include local databases $156_1 \ldots 156_N$, and remote databases $157_1 \ldots 157_N$, collectively referred to as database(s) 156-157). Illustratively, the databases 156 are shown as part of a database management system (DBMS) 154 in storage 134. More generally, as used herein, the term "databases" refers to any collection of data regardless of the particular physical representation. By way of illustration, the databases 156-157 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data which is described by a data repository abstraction 148.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by the data repository abstraction (DRA) component 148 of the abstract query interface 146. The abstract queries are executed by a runtime component 150 which transforms the abstract queries into a form (referred to herein as a concrete query) consistent with the physical representation of the data contained in one or more of the databases 156-157. The queries may be configured to access the data and return results, or to modify (i.e., insert, delete or update) the data. The application query specification 142, the abstract query interface 146 and the data repository abstraction component 148 are further described with reference to FIGS. 2A-B.

In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (http) server process 138 (e.g., a web server) adapted to service requests from the client computer 102. For example, the process 138 may respond to requests to access a database(s) 156, which illustratively resides on the server 104. Incoming client requests for data from a database 156-157 invoke an application 140. When executed by the processor 130, the application 140 causes the server computer 104 to perform the steps or elements embodying the various aspects of the invention, including accessing the database(s) 156-157. In one embodiment, the application 140 comprises a plurality of servlets configured to build GUI elements, which are then rendered by the browser program 122. Where the remote databases 157 are accessed via the application 140, the data repository abstraction component 148 is configured with a location specification identifying the database containing the data to be retrieved. This latter embodiment will be described in more detail below.

In one embodiment, the server computer 104 is further configured with a data repository abstraction generator 164 (DRA generator). The DRA generator 164 is invoked to generate data repository abstraction components or to modify the existing data repository abstraction component. For example, DRA generator may generate modified versions of the data repository abstraction component 148, either by replacing the data repository abstraction component or changing its attributes. Such modified versions are also referred to herein as "derived DRAs" because the modified versions are derived from a preexisting DRA. In one embodiment, a derived DRA persists in memory only for a user session. For example, a derived DRA may be discarded once a user logs off of the system. Alternatively, a derived DRA may be stored and retrieved for later use.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 138 shown in FIG. 1 is merely illustrative and other embodiments adapted to support any known and unknown protocols are contemplated.

Logical/Runtime View of Environment

Figure 2A:
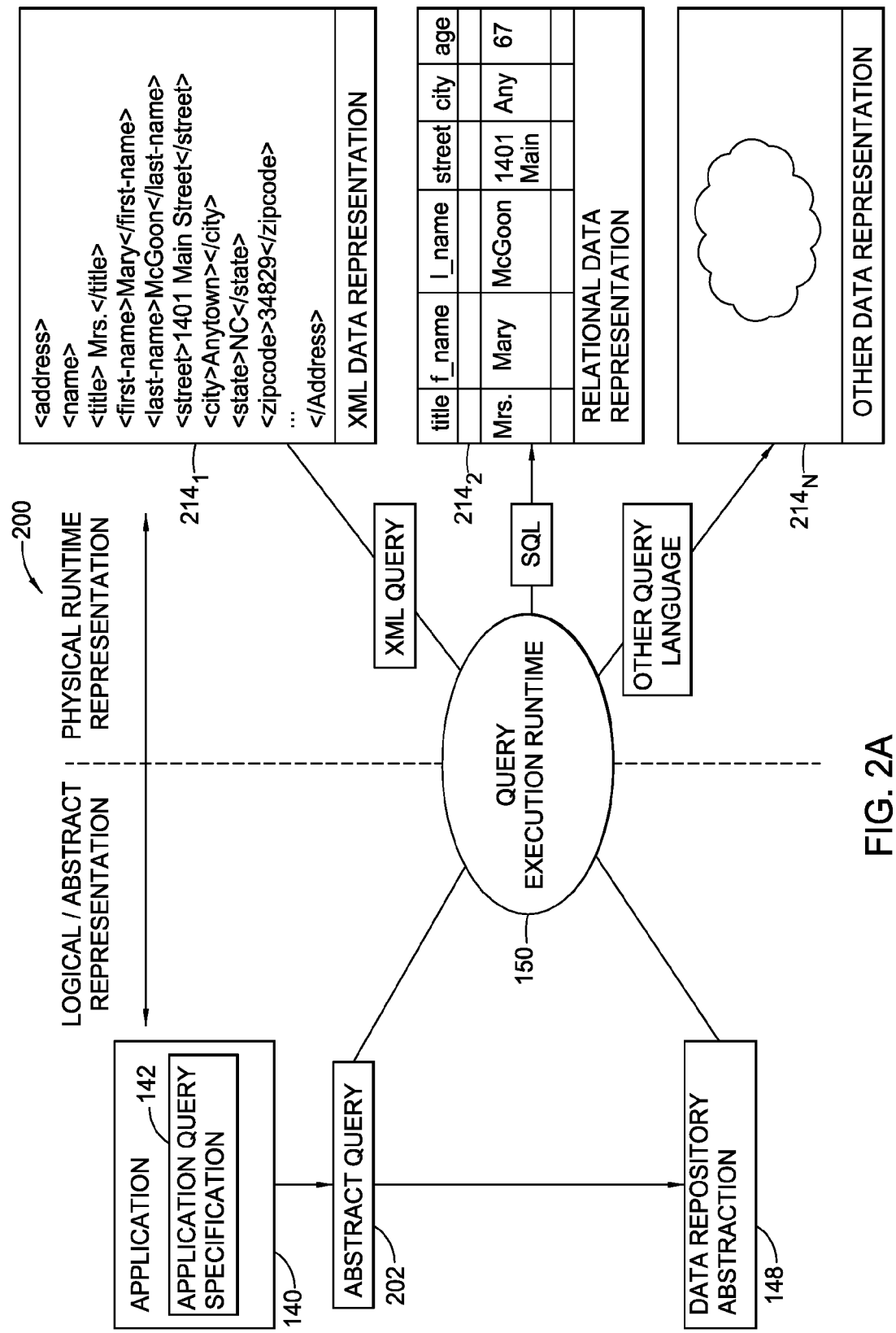
FIGS. 2A and 2B are relational views of software components of one embodiment of the invention.
Figure 2B:
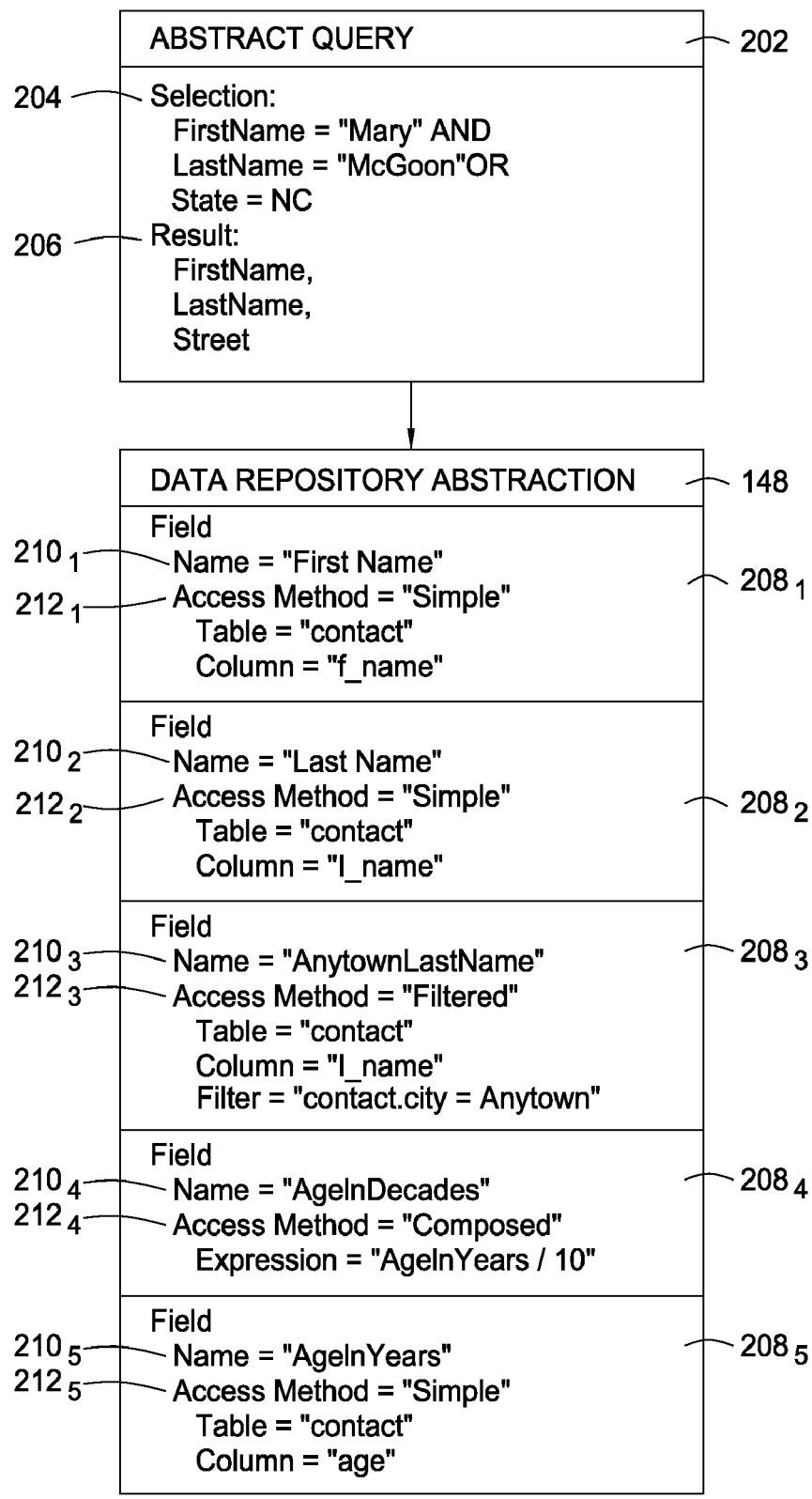

FIGS. 2A-B show a plurality of interrelated components of the invention. The requesting entity (e.g., one of the applications 140) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the databases 156-157. As a result, abstract queries may be defined that are independent of the particular underlying data representation used. In one embodiment, the application query specification 142 may include both criteria used for data selection (selection criteria 204) and an explicit specification of the fields to be returned (return data specification 206) based on the selection criteria 204.

The logical fields specified by the application query specification 142 and used to compose the abstract query 202 are defined by the data repository abstraction component 148. In general, the data repository abstraction component 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the databases 156-157, thereby allowing queries to be formed that are loosely coupled to the underlying data representation. The data to which logical fields of the DRA 148 are mapped may be located in a single repository (i.e., source) of data or a plurality of different data repositories. Thus, the DRA 148 may provide a logical view of one or more underlying data repositories. By using an abstract representation of a data repository, the underlying physical representation can be more easily changed or replaced without affecting the application making the changes. Instead, the abstract representation is changed with no changes required by the application. In addition, multiple abstract data representations can be defined to support different applications against the same underlying database schema that may have different default values or required fields.

In general, the data repository abstraction component 148 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification comprises a logical field name $210_1$, $210_2$, $210_3$, $210_4$, $210_5$ (collectively, field name 210) and an associated access method $212_1$, $212_2$, $212_3$, $212_4$, $212_5$ (collectively, access method 212). The access methods associate (i.e., map) the logical field names to a particular physical data representation $214_1$, $214_2$ ... $214_N$ in a database (e.g., one of the databases 156) according to parameters referred to herein as physical location parameters. By way of illustration, two data representations are shown, an XML data representation $214_1$ and a relational data representation $214_2$. However, the physical data representation $214_N$ indicates that any other data representation, known or unknown, is contemplated.

Any number of access methods is contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact", where the table name and the column name are the physical location parameters of the access method $212_1$. The field specification $208_3$ exemplifies a filtered field access method $212_3$. Filtered fields identify an associated physical entity and provide rules used to define a particular subset of items within the physical data representation. An example is provided in FIG. 2B in which the filtered field access method $212_3$ maps the logical field name $210_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may be computed. In the example illustrated in FIG. 2B the composed field access method $212_3$ maps the logical field name $210_3$ "AgeInDecades" to "AgeInYears/10." Another example is a sales tax field that is composed by multiplying a sales price field by a sales tax rate.

It is noted that the data repository abstraction component 148 shown in FIG. 2B is merely illustrative of selected logical field specifications and is not intended to be comprehensive. As such, the abstract query 202 shown in FIG. 2B includes some logical fields for which specifications are not shown in the data repository abstraction component 148, such as "State" and "Street."

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the data repository abstraction component 148 shown in FIG. 2A are representative of logical fields mapped to data represented in the relational data representation $214_2$. However, other instances of the data repository abstraction component 148 map logical fields to other physical data representations, such as XML. Further, in one embodiment, a data repository abstraction component 148 is configured with access methods for procedural data representations. One embodiment of such a data repository abstraction component 148 is described below with respect to FIG. 8.

An illustrative abstract query corresponding to the abstract query 202 shown in FIG. 2 is shown in Table I below. By way of illustration, the data repository abstraction 148 is defined using XML. However, any other language may be used to advantage.

TABLE I

QUERY EXAMPLE

| | |
|---|---|
| 001 | <?xml version="1.0"?> |
| 002 | <!--Query string representation: (FirstName = "Mary" AND LastName = |
| 003 | "McGoon") OR State = "NC"--> |
| 004 | <QueryAbstraction> |
| 005 |   <Selection> |
| 006 |     <Condition internalID="4"> |
| 007 |       <Condition field="FirstName" operator="EQ" value="Mary" |
| 008 | internalID="1"/> |
| 009 |       <Condition field="LastName" operator="EQ" value="McGoon" |
| 010 | internalID="3" relOperator="AND"></Condition> |
| 011 |     </Condition> |
| 012 |     <Condition field="State" operator="EQ" value="NC" internalID="2" |
| 013 | relOperator="OR"></Condition> |
| 014 |   </Selection> |
| 015 |   <Results> |
| 016 |     <Field name="FirstName"/> |
| 017 |     <Field name="LastName"/> |
| 018 |     <Field name="State"/> |
| 019 |   </Results> |
| 020 | </QueryAbstraction> |

Illustratively, the abstract query shown in Table I includes a selection specification (lines 005-014) containing selection criteria and a results specification (lines 015-019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative instance of a data repository abstraction component 148 corresponding to the abstract query in Table I is shown in Table II below. By way of illustration, the data repository abstraction component 148 is defined using XML. However, any other language may be used to advantage.

TABLE II

DATA REPOSITORY ABSTRACTION EXAMPLE

| | |
|---|---|
| 001 | <?xml version="1.0"?> |
| 002 | <DataRepository> |
| 003 |   <Category name="Demographic"> |

TABLE II-continued

DATA REPOSITORY ABSTRACTION EXAMPLE

| | |
|---|---|
| 004 |     <Field queryable="Yes" name="FirstName" displayable="Yes"> |
| 005 |       <AccessMethod> |
| 006 |         <Simple columnName="f_name" tableName="contact"></Simple> |
| 007 |       </AccessMethod> |
| 008 |       <Type baseType="char"></Type> |
| 009 |     </Field> |
| 010 |     <Field queryable="Yes" name="LastName" displayable="Yes"> |
| 011 |       <AccessMethod> |
| 012 |         <Simple columnName="l_name" tableName="contact"></Simple> |
| 013 |       </AccessMethod> |
| 014 |       <Type baseType="char"></Type> |
| 015 |     </Field> |
| 016 |     <Field queryable="Yes" name="State" displayable="Yes"> |
| 017 |       <AccessMethod> |
| 018 |         <Simple columnName="state" tableName="contact"></Simple> |
| 019 |       </AccessMethod> |
| 020 |       <Type baseType="char"></Type> |
| 021 |     </Field> |
| 022 |   </Category> |
| 023 | </DataRepository> |

Note that lines 004-009 correspond to the first field specification $208_1$ of the DRA 148 shown in FIG. 2B and lines 010-015 correspond to the second field specification $208_2$. For brevity, the other field specifications defined in Table I have not been shown in FIG. 2B. Note also that Table I illustrates a category, in this case "Demographic." A category is a grouping of one or more logical fields. In the present example, "First Name," "Last Name" and "State" are logical fields belonging to the common category, "Demographic."

In any case, a data repository abstraction component 148 contains (or refers to) at least one access method which maps a logical field to physical data. However, the foregoing embodiments are merely illustrative and the logical field specifications may include a variety of other metadata. In one embodiment, the access methods are further configured with a location specification defining a location of the data associated with the logical field. In this way, the data repository abstraction component 148 is extended to include description of a multiplicity of data sources that can be local and/or distributed across a network environment. The data sources can be using a multitude of different data representations and data access techniques. In this manner, an infrastructure is provided which is capable of capitalizing on the distributed environments prevalent today. One approach for accessing a multiplicity of data sources is described in more detail in U.S. patent application Ser. No. 10/131,984, entitled "REMOTE DATA ACCESS AND INTEGRATION OF DISTRIBUTED DATA SOURCES THROUGH DATA SCHEMA AND QUERY ABSTRACTION" and assigned to International Business Machines, Inc.

Figure 3:
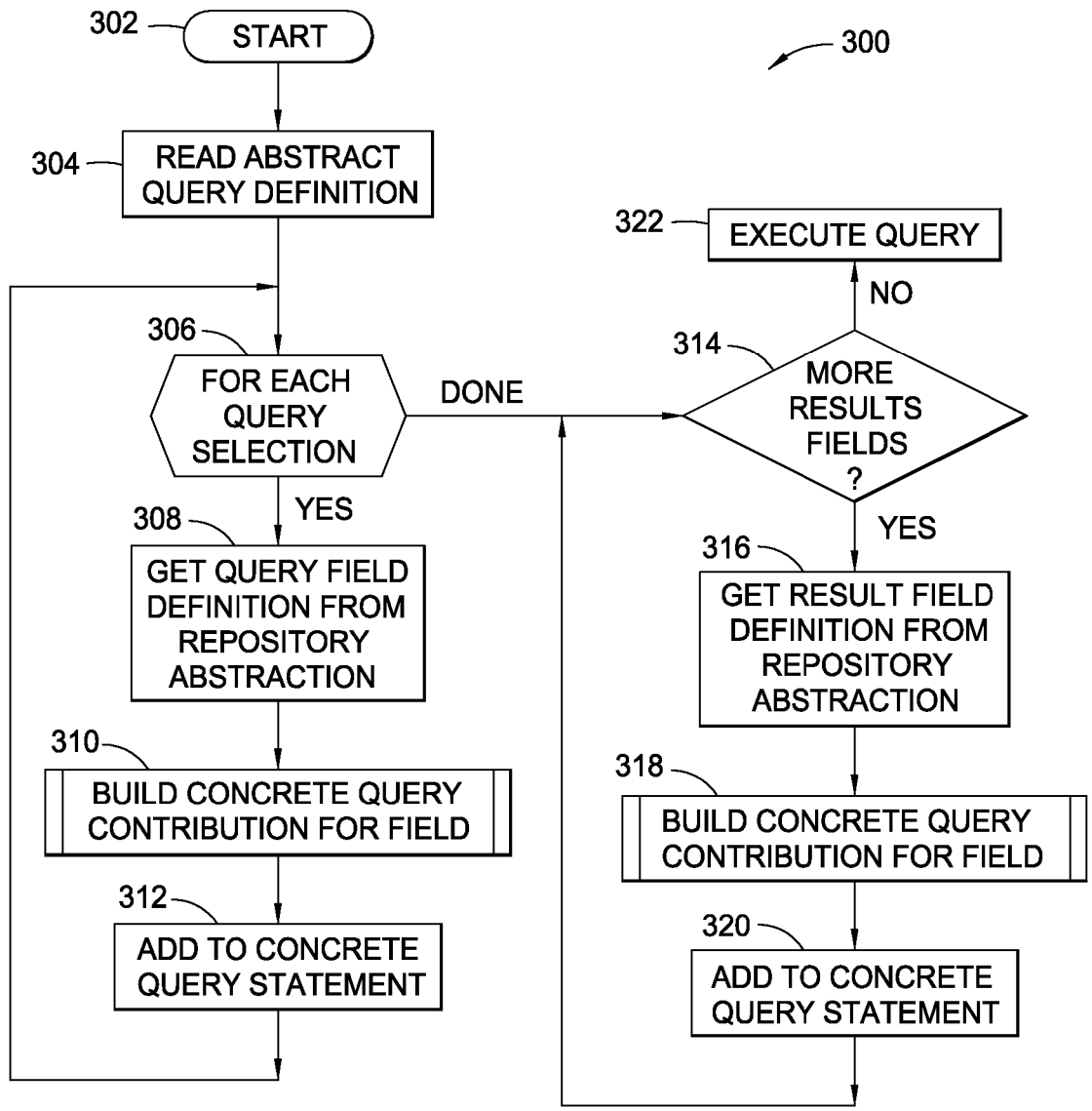
FIG. 3 is a flow chart illustrating the operation of a runtime component.

FIG. 3 shows an illustrative runtime method 300 exemplifying one embodiment of the operation of the runtime component 150. The method 300 is entered at step 302 when the runtime component 150 receives as input an instance of an abstract query (such as the abstract query 202 shown in FIG. 2). At step 304, the runtime component 150 reads and parses the instance of the abstract query and locates individual selection criteria and desired result fields. At step 306, the runtime component 150 enters a loop (comprising steps 306, 308, 310 and 312) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 308, the runtime component 150 uses the field name from a selection criterion of the abstract query to look up the definition of the field in the data repository abstraction 148. As noted above, the field definition includes a definition of the access method used to access the physical data associated with the field. The runtime component 150 then builds (step 310) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from a physical data repository, represented by the databases 156-157 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 150 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 150 looks up a result field name (from the result specification of the abstract query) in the data repository abstraction 148 and then retrieves a Result Field Definition from the data repository abstraction 148 to identify the physical location of data to be returned for the current logical result field. The runtime component 150 then builds (as step 318) a Concrete Query Contribution (of the concrete query that identifies physical location of data to be returned) for the logical result field. At step 320, Concrete Query Contribution is then added to the Concrete Query Statement. Once each of the result specifications in the abstract query has been processed, the query is executed at step 322.

Figure 4:
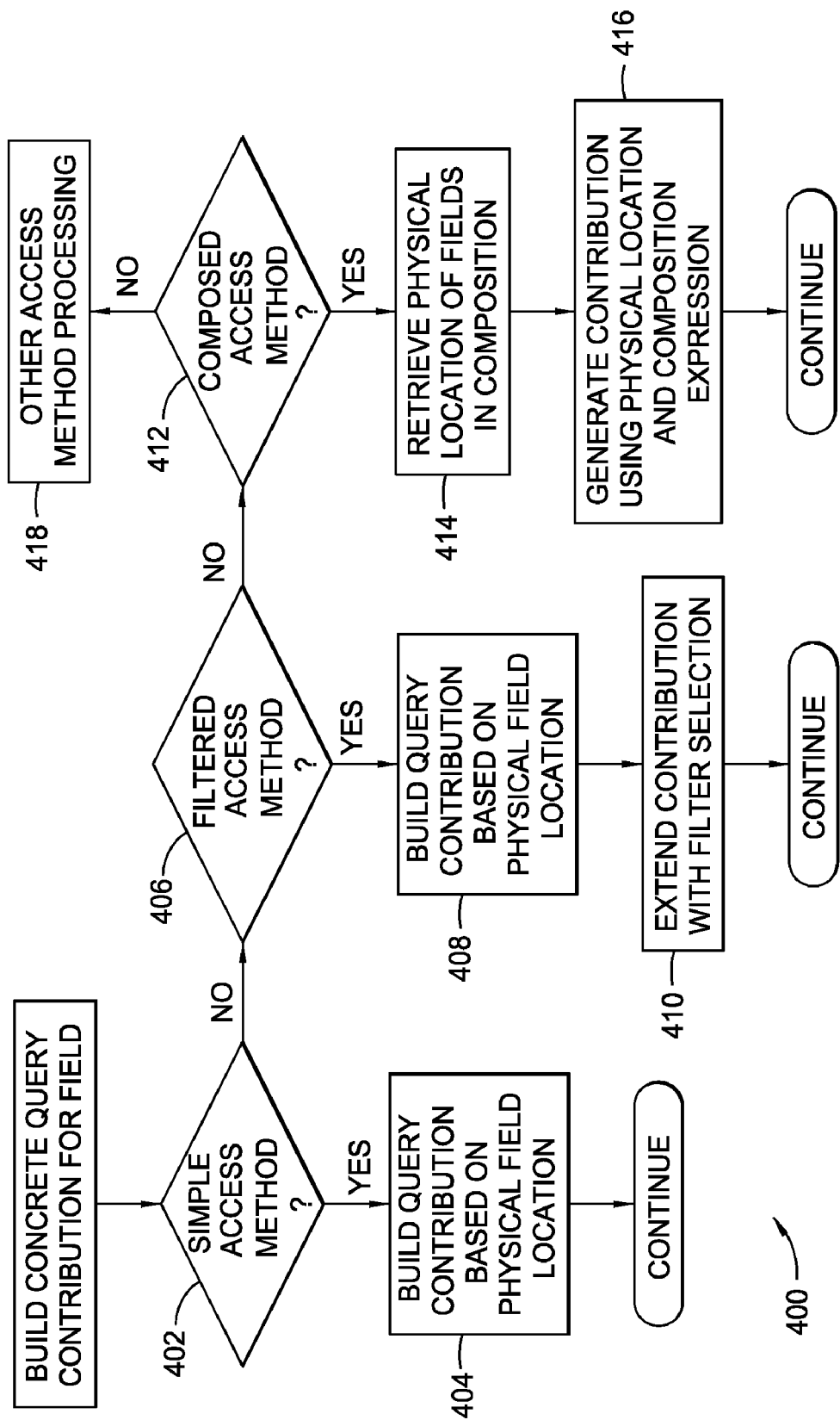
FIG. 4 is a flow chart illustrating the operation of a runtime component.

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

Derived Data Repository Abstraction Components

In one embodiment, a data repository abstraction component is derived for each iterative query based on the results of the executed query. That is, the derived DRA includes a logical field for each result field of the query, wherein each logical field is mapped to the appropriate underlying physical data. The subsequent query is then executed based on the most current derived DRA.

Figure 5:
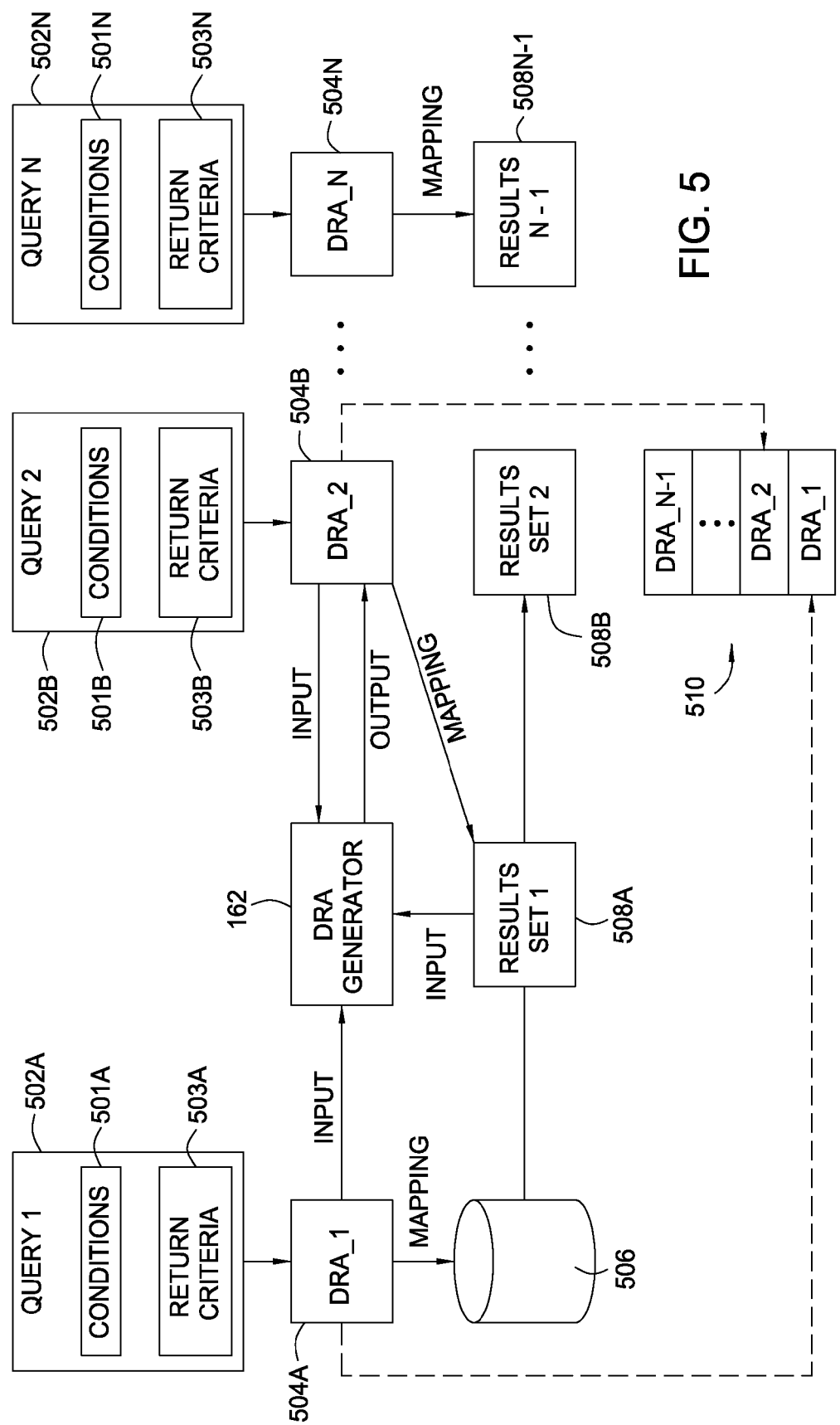
FIG. 5 is a block diagram showing a data repository abstraction generator configured to generate abstract data models mapping logical fields to results of an immediately previous query.

Referring now to FIG. 5, a first DRA 504A is shown. The DRA 504A includes a plurality of logical fields (not shown) which map to data in a database 506. An abstract query 502A issued against the DRA 504A is configured with conditions 501A and return criteria 503A. In an SQL counterpart statement (after the abstract query 502A is transformed into a concrete query), the return criteria 503 are the SELECT clause and the conditions are the WHERE clause of the statement. When executed, the query 502A returns a first result set 508A (which may be formatted by the runtime component 150, shown in FIG. 2A). Using the first DRA 504A and the first result set 508A as input, the DRA generator 162 generates a second DRA 504B configured with a plurality of logical fields (not shown) mapped to the first result set 508A. A second abstract query 502B is then executed with respect to the second DRA 504B which produces a second result set 508B. The DRA generator 162 may then generate another DRA which maps to the second result set 508B. This process may be performed for each successive abstract query as represented by the Nth abstract query 502N having conditions 501N and return criteria 503N. The Nth query 502N is issued with respect to the Nth DRA 504N which maps to the result set 508N-1 of the previous query.

As noted previously, it may be desirable for a user to return to the previous derived DRA. As such, one embodiment provides for preserving the DRAs using a stack 510. A stack is a well-known data storage area or buffer, which may be implemented as a push-down list following a LIFO (last-in firstout) scheme. That is, the last item pushed onto (i.e., placed on) the stack is the first item popped (i.e., removed) from the stack. For each derivation of a DRA, the previous DRA is pushed onto the stack 510. A user desiring to return to a previous derivation of the DRA successively pops each DRA from the stack 510 until arriving at the desired DRA. In addition, prior results may be saved, e.g., in a series of temporary tables with each table containing the results of a given prior query. Each derived DRA then references the temporary table containing results of the query used to generate the derived DRA. Each temporary table may be maintained for as long a period of time as the corresponding derived DRA is maintained (e.g., if derived DRAs persist for the duration of the user's session, so would the corresponding temporary tables).

Figure 6:
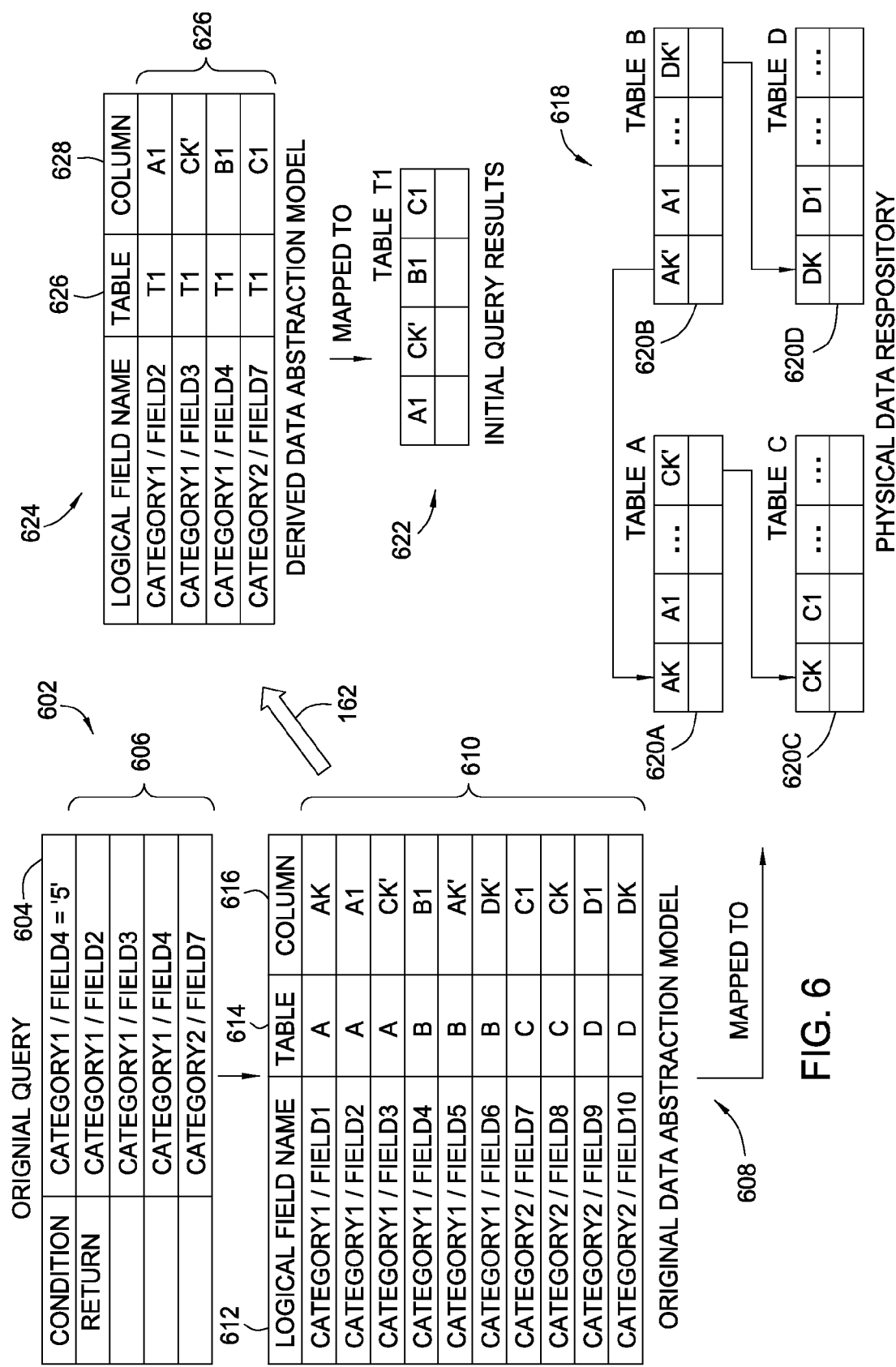
FIG. 6 is a block diagram illustrating the generation of an abstract data model based on results of an abstract query.

Referring now to FIG. 6, additional details for the generation of DRAs are described. Illustratively, FIG. 6 shows an initial DRA 608. The DRA 608 includes a plurality of field specifications 610 each of which map to data in a data repository 618. In the present example, the data repository 618 is a relational database including a plurality of tables 620A-D (four shown). Accordingly, the field specifications 610 are defined by a logical field name 612, a table name 614 and a column name 616. As described above with respect to FIG. 2B, the values of the table name 614 and column name 616 are the parameters passed to the access method of the respective logical field in order to retrieve data from the repository 618. Illustratively, the logical fields also include category metadata, whereby the logical fields 1-6 are part of Category 1 and logical fields 7-10 are part of Category 2.

A first abstract query 602 is shown configured with a condition 604 and return criteria 606. The condition 604 and return criteria 606 of the abstract query 602 are each configured with one or more logical fields, each of which are represented in the DRA 608. By way of example, the condition 604 specifies a value of "5" for Field 4 and the return criteria 606 specifies that data is to be returned for Fields 2-4 and Field 7 where the condition 604 is satisfied.

Execution of the abstract query 602 returns query results 622. The query results are arranged as a data structure consistent with the particular schema of the data repository 618. Accordingly, where the data repository 618 is a relational database, the query results 622 are formatted as a table, T1. Alternatively, since the user is shielded from the particulars of the underlying data, the query results 622 may even be formatted in a schema different from that of the data repository 618. For example, if the data repository 618 is a relational database, the query results 622 may be formatted as an XML document. It is contemplated that the latter approach would require either a database engine that supported both relational and XML queries or more than one database engine, with one engine handling relational data storage and queries and the other handling XML data storage and queries.

In any case, the DRA generator 162 generates a derived DRA 624 based on the results 622. Specifically, the derived DRA includes a plurality of logical fields 626 each of which maps to the query results 622. Note that the plurality of logical fields 626 is a subset of the original plurality of logical fields 608 and corresponds to the logical fields specified in the return criteria 606 of the abstract query 602. However, the physical location parameters (e.g., table name 626 and column name 628 in the case of a relational schema) of the logical fields 626 have been updated to point to the query results 622. Specifically, each logical field 626 points to a different column of the table T1.

In one aspect, the derived DRA 624 preserves attributes of the original DRA 608. For example, the data type, the logical field name and the categorization scheme represented in the original DRA 608 are preserved in the derived DRA 624. Attributes of the underlying data repository 618 may also be preserved.

Figure 7:
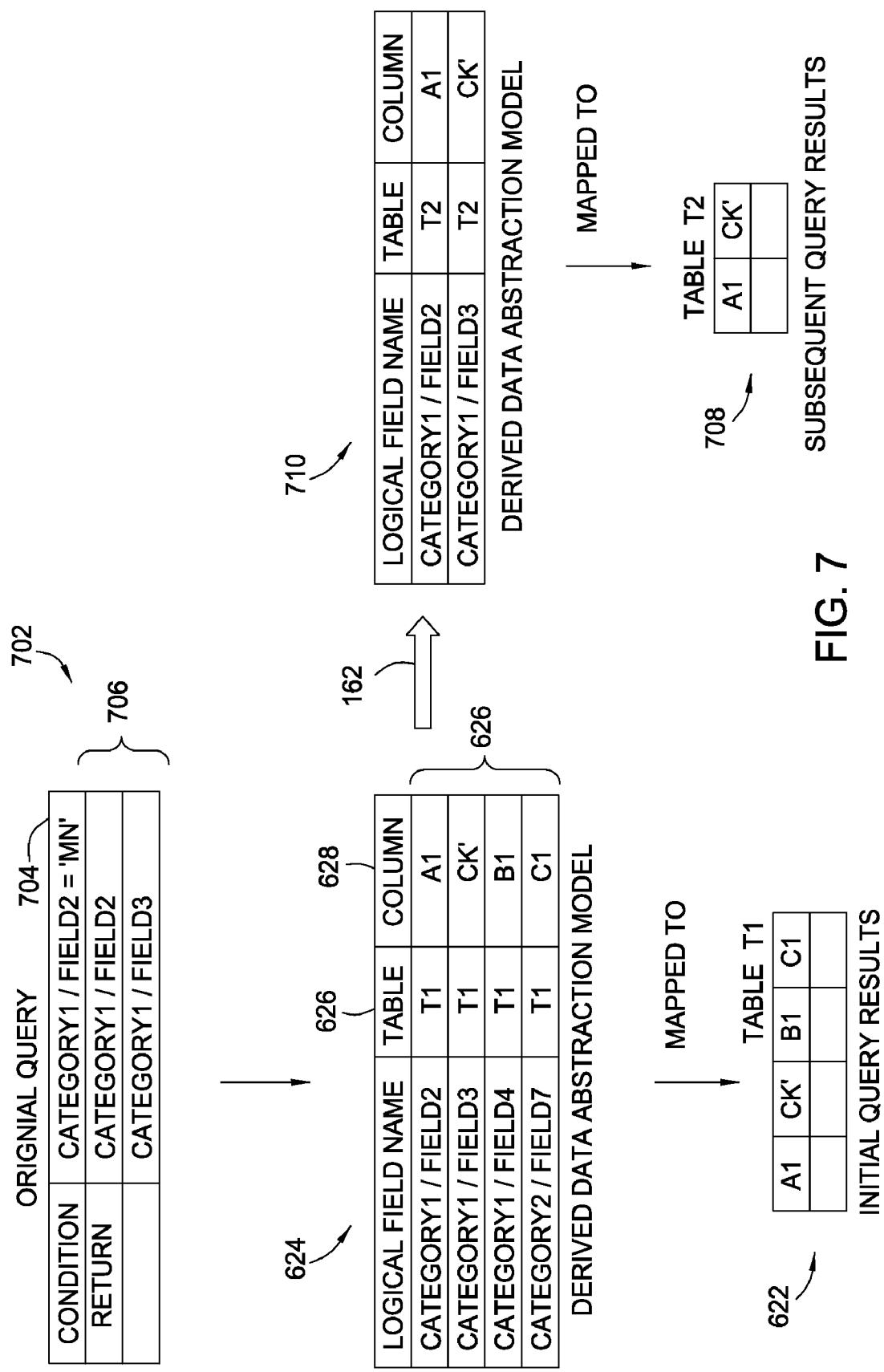
FIG. 7 is a block diagram illustrating the generation of another abstract data model based on results of an abstract query.

Referring to the FIG. 7 a second query iteration based on the derived DRA 624 of FIG. 6 is illustrated. In this case, a second query 702 includes a condition 704 specifying the logical Field 2, and result criteria 706 specifying the logical Fields 2-3. Consequently, the query results 708 include a column corresponding to each logical field specified in the result criteria. In the present example, the logical fields specified in the result criteria 706 map to column A1 of table T1 and column CK' of table T1, respectively. Accordingly, the results 708 populate a table T2 having a column A1 and a column CK'. The DRA generator 162 then generates a derived DRA 710 which includes the logical fields corresponding to column A1 of table T1 and column CK' of table T1, except that the logical fields are updated to map to each of the two columns, A1 and CK', in the results 708.

Figure 8:
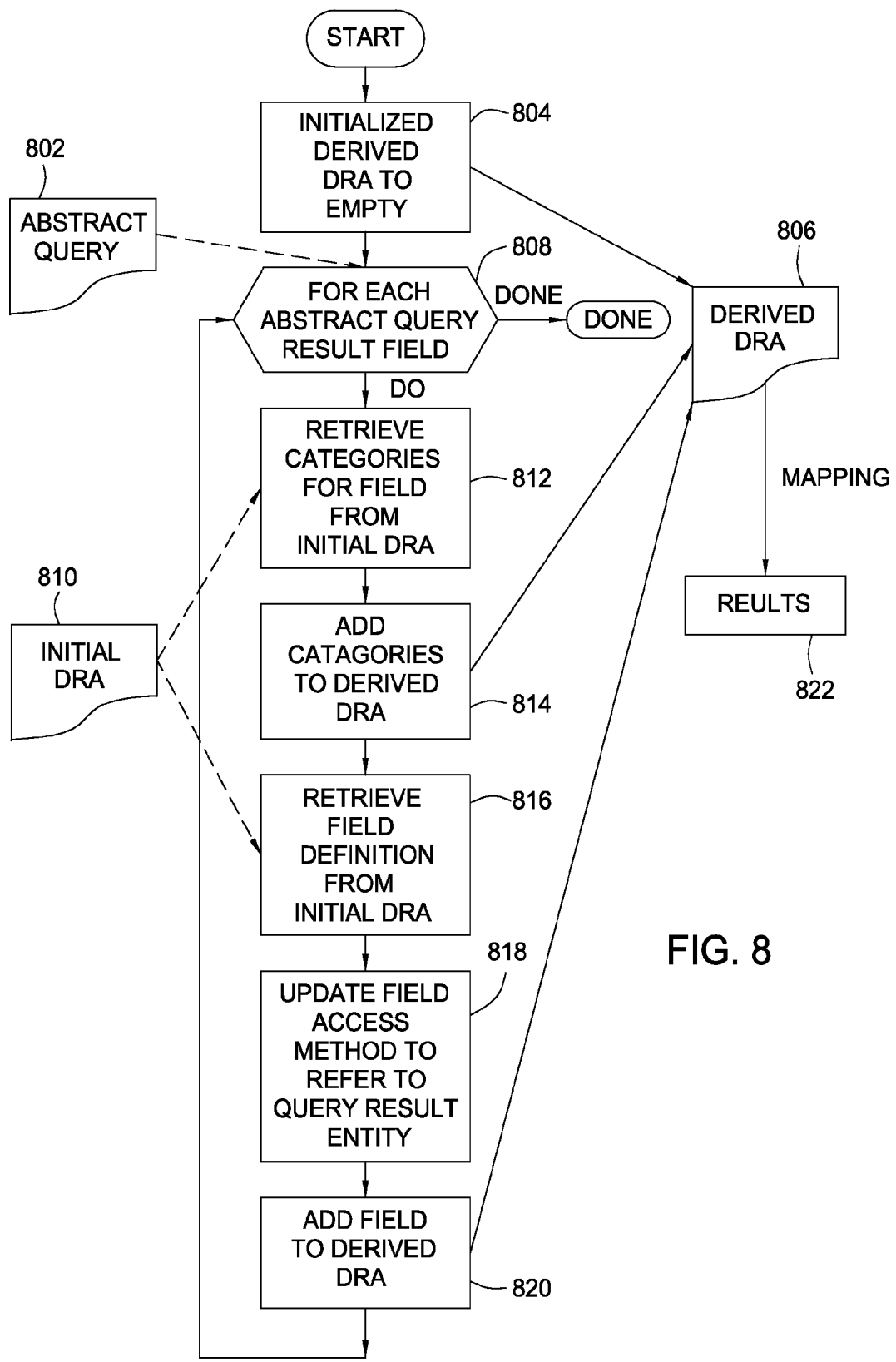
FIG. 8 it is a flow chart illustrating an algorithm to create an abstract data model.

Referring now to FIG. 8, a flowchart illustrates one embodiment of a method 800 implemented by the DRA generator 162 for creating a derived DRA. The method 800 may be entered after execution of the abstract query 802 based on an initial DRA 810 and for which results 822 were returned. The DRA generator 162 then initializes a derived DRA 806 to empty (step 804). A loop is then entered (and step 808) for each result field in the result criteria of the abstract query 802. If the metadata of the initial DRA 810 specifies a category (or categories), the category(s) for the current result field is retrieved from the initial DRA 810 (step 812) and added to the derived DRA 806 (step 814). Next, the logical field definition for the current result field is retrieved from the initial DRA 810 (step 816). The DRA generator 162 then updates the access method for the logical field definition to refer to the results 822 (step 818) and as the logical field definition to the derived DRA 806 (step 820).

In the embodiment described with respect to FIG. 8, a derived DRA is a separate entity, i.e., separate from the initial DRA which may persist in some data storage area (e.g., the stack 510 described with respect FIG. 5). Alternatively, the derived DRA may be a modified version of the initial DRA by removing the appropriate logical fields from the initial DRA. That is, those fields which are not present as result fields in the immediately preceding query are removed.

Figure 10:
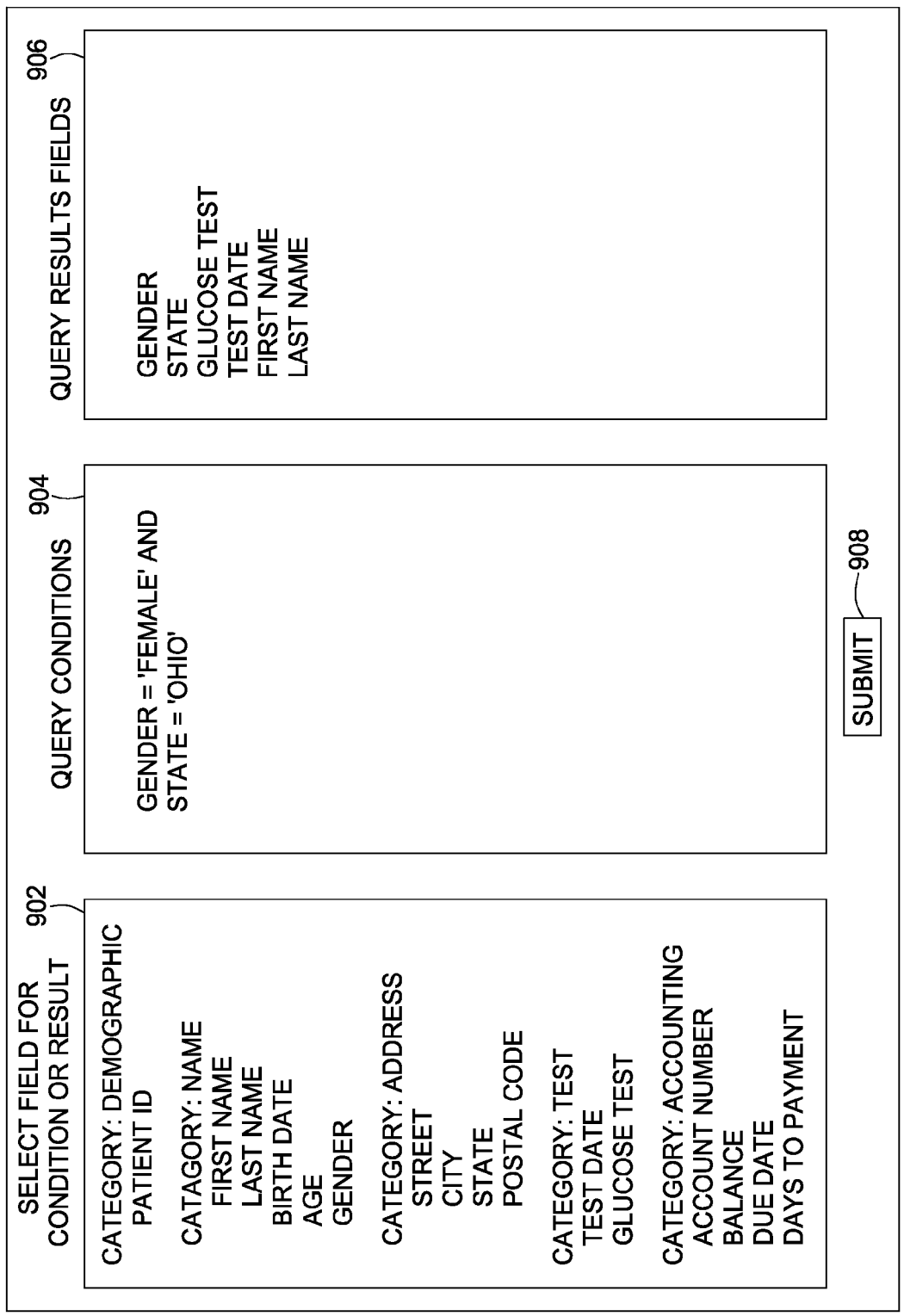
Figure 11:
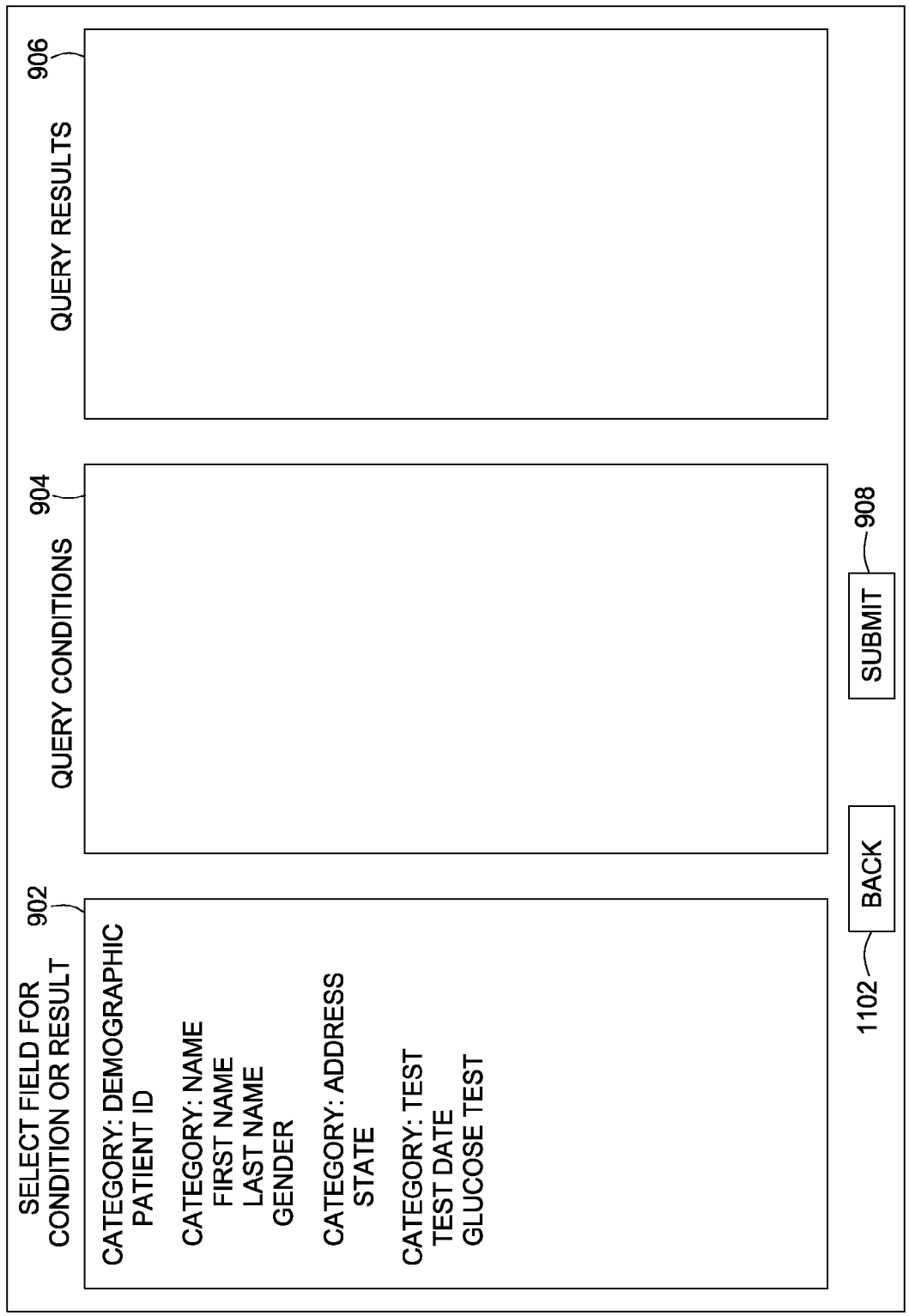

In one aspect, an advantage is provided to users constructing queries against data repository abstraction models. Since the view of the underlying data is dictated by the DRA, the user is given an increasingly restricted view of the data with each successive query. This aspect of the invention may be illustrated with reference to FIGS. 9-11.

Figure 9:
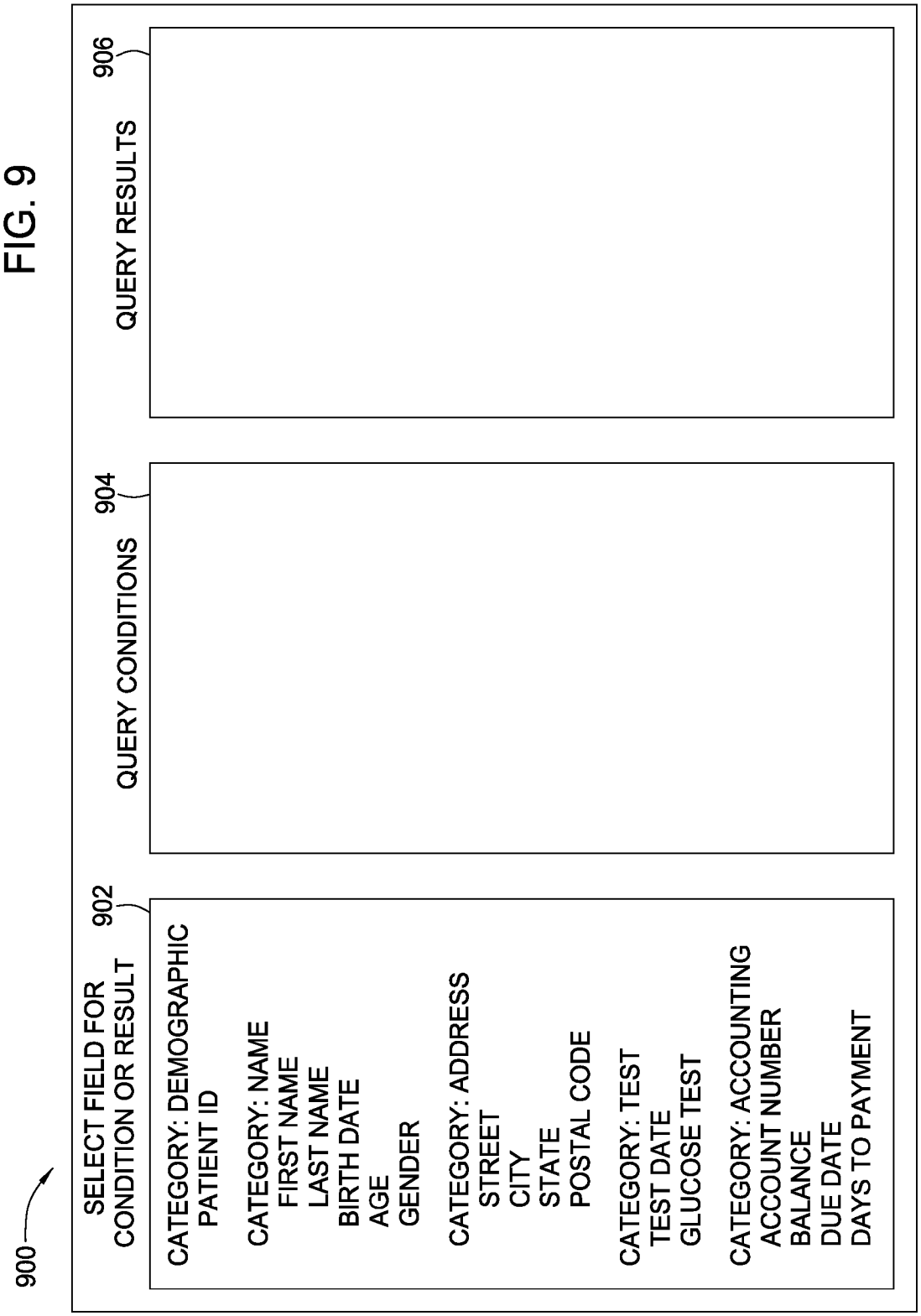
FIGS. 9-11 are screens of a user interface configured for constructing abstract queries based on displayed logical fields, each of which is defined by an abstract data model.

Referring first to FIG. 9, a screen 900 is shown which may be viewed through the browser program 122 (FIG. 1). The screen 900 includes a Selection panel 902, a Query Conditions panel 904 in a Query Results Fields panel 906. The Selection panel 902 displays each of the logical fields defined by a DRA. If defined, categories are also displayed. Using the displayed logical fields, the user may construct a query by specifying conditions in the Query Conditions panel 904 and specifying result fields in the Query Results Fields panel 906, as illustrated by the screen 900 FIG. 10. In this particular illustration, the Query Results Fields panel 906 includes six logical fields (result fields): Gender, State, Glucose Test, Test Date, First Name and Last Name. The query may then be executed by clicking the Submit the 908. After execution of the query, the results of the query may be displayed to the user in another screen (not shown).

For the next query, the Selection panel 902 shows the logical fields of the derived DRA generated by the DRA generator 162 based on the query results fields of the previous query. For the illustrative query of FIG. 10, the logical fields of the derived DRA are shown in the Selection panel 902 of FIG. 11. Accordingly, the displayed logical fields include First Name, Last Name, Gender, State, Test Date and Glucose Test. Based on the displayed logical fields, the user may construct another query. This process may be performed iteratively whereby the number of displayed/available logical fields is successively reduced. Additionally, at any point during the iterative query construction process the user may decide to return to a previous instance of the DRA by clicking a Back button 1102. As noted above, navigation in this manner may be facilitated by the provision of a stack, although any other technique may be used to this end.

In various embodiments, numerous advantages over the prior art are provided. In one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case with a given physical data representation is modified or restructured, the corresponding data repository abstraction is updated to reflect changes made to the underlying physical data model. The same set of logical fields is available for use by queries, and have merely been bound to different entities or locations in physical data model. As a result, requesting entities written to the abstract query interface continue to function unchanged, even though the corresponding physical data model has undergone significant change. In the event a requesting entity is to be used with a completely new physical data representation different than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

In another aspect, the ease-of-use for the application builder and the end-user is facilitated. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data repository abstraction provides a data filtering mechanism, exposing pertinent data and hiding nonessential content that is not needed by a particular class end-user developing the given query.

Solutions implementing the present model use the provided abstract query specification to describe its information requirements, without regard for the location or representation of the data involved. Queries are submitted to the runtime component which uses the data repository abstraction component to determine the location and method used to access each logical piece of information represented in the query. In one embodiment, the runtime component also includes the aforementioned data caching function to access the data cache.

In one aspect, this model allows solutions to be developed independent of the physical location or representation of the data used by the solution, making it possible to easily deploy the solution to a number of different data topologies and allowing the solution to function in cases where data is relocated or reorganized over time. In another aspect, this approach also simplifies the task of extending a solution to take advantage of additional information. Extensions are made at the abstract query level and do not require addition of software that is unique for the location or representation of the new data being accessed. This method provides a common data access method for software applications that is independent of the particular method used to access data and of the location of each item of data that is referenced. The physical data accessed via an abstract query may be represented relationally (in an existing relational database system), hierarchically (as XML) or in some other physical data representation model. A multitude of data access methods are also supported, including those based on existing data query methods such as SQL and XQuery and methods involving programmatic access to information such as retrieval of data through a Web Service invocation (e.g., using SOAP) or HTTP request.

While the foregoing is directed to embodiments of the present invention, other and further embodiments of the invention may be devised without departing from the basic scope thereof, and the scope thereof is determined by the claims that follow.

What is claimed is:

1. A computer-implemented method for providing a framework for querying abstractly represented data, comprising:
    providing an abstract data model generator configured to successively generate each of a plurality of abstract data models from: (i) a last generated abstract data model and (ii) an abstract query executed against the last generated abstract data model and by operation of one or more computer processors, wherein the last generated abstract model of a first abstract data model of the plurality of abstract models comprises an initial abstract data model, wherein each of the plurality of abstract data models is generated based on: (i) a logical result field of the abstract query executed against the last generated abstract data model and (ii) results returned for the abstract query executed against the last generated abstract data model, and wherein each abstract data model is used for programmatically transforming an abstract query to a physical query and comprises:
    (a) one or more logical field definitions including only the logical result field of the abstract query executed against the last generated abstract data model; and
    (b) mapping information for each of the one or more logical field definitions, which maps each of the logical field definitions to a separate portion of the data.

2. The method of claim 1, wherein the data comprises a plurality of tables in a database.

3. The method of claim 1, further comprising a run-time component to transform, according to each abstract data model, the abstract queries into physical queries consistent with the data.

4. The method of claim 1, further comprising an interface from which only those logical fields defined by each abstract data model is selectable in generating abstract queries to access the data.

5. The method of claim 1, further comprising providing a data storage area for storing each derivation of the abstract data model generated by the abstract data model generator.

6. The method of claim 5, further comprising:
retrieving a previous derivation of the abstract data model; and
displaying a name of each of the logical field definitions associated with the previous derivation.

7. A computer comprising a memory and at least one processor, and further comprising a framework for defining and processing abstract queries for accessing physical data, the framework comprising:
an abstract data model generator configured to successively generate each of a plurality of abstract data models from: (i) a last generated abstract data model and (ii) an abstract query executed against the last generated abstract data model and by operation of one or more computer processors, wherein the last generated abstract model of a first abstract data model of the plurality of abstract models comprises an initial abstract data model, wherein each of the plurality of abstract data models is generated based on: (i) one or more logical result fields of the abstract query executed against the last generated abstract data model and (ii) results returned for the abstract query executed against the last generated abstract data model, and wherein each abstract data model is used for programmatically transforming an abstract query to a physical query and comprises:
(a) a logical field definition only for each logical result field of the abstract query executed against the last generated abstract data model; and
(b) mapping information for each of the one or more logical field definitions, which maps each of the logical field definitions to a separate portion of the results returned for the abstract query executed against the last generated abstract data model.

8. The computer of claim 7, the framework further comprising a run-time component to transform, according to each abstract data model, the abstract queries into physical queries consistent with the data.

9. The computer of claim 7, the framework further comprising an interface from which each of the logical fields defined by each abstract data model is selectable in generating abstract queries to access the data.

10. The computer of claim 7, wherein the mapping information comprises an access method for each of the logical field definitions, wherein the access method describes a location of the respective separate portion of the results.

* * * * *